United States Patent
Galad et al.

(10) Patent No.: US 6,568,424 B1
(45) Date of Patent: May 27, 2003

(54) METHOD AND VALVE FOR PREVENTING UNAUTHORIZED ACCESS

(76) Inventors: Shimon Galad, Bereshit Street 1, 47201 Ramat Hasharon (IL); Oded Arbel, Neurim Street 54, 37000 Karkur (IL)

(*) Notice: Subject to any disclaimer, the term of this patent is extended or adjusted under 35 U.S.C. 154(b) by 0 days.

(21) Appl. No.: 09/869,560
(22) PCT Filed: Dec. 30, 1999
(86) PCT No.: PCT/IL99/00707
§ 371 (c)(1),
(2), (4) Date: Sep. 24, 2001
(87) PCT Pub. No.: WO00/40882
PCT Pub. Date: Jul. 13, 2000

(30) Foreign Application Priority Data

Jan. 1, 1999 (IL) .................................. 127901

(51) Int. Cl.[7] .............................................. F16K 15/00
(52) U.S. Cl. .................... 137/523; 251/65; 251/129.01; 251/129.04
(58) Field of Search ................. 137/522, 523, 137/587; 251/129.01, 65, 129.04; 141/349, DIG. 1

(56) References Cited

U.S. PATENT DOCUMENTS

| | | | | |
|---|---|---|---|---|
| 2,576,168 A | * | 11/1951 | Allen | 251/65 |
| 2,700,395 A | * | 1/1955 | Young | 251/65 |
| 3,552,432 A | * | 1/1971 | Wagner | 137/523 |
| 3,589,397 A | | 6/1971 | Wagner | |
| 3,834,412 A | | 9/1974 | Fannin | |
| 3,856,262 A | * | 12/1974 | Jordan | 251/149.4 |
| 3,981,328 A | * | 9/1976 | Yonezawa | 137/523 |
| 4,010,984 A | * | 3/1977 | Coleman | 303/89 |
| 4,018,314 A | | 4/1977 | Richmond et al. | |
| 4,252,094 A | * | 2/1981 | Draxler | 137/523 |
| 4,273,153 A | * | 6/1981 | Brown | 251/65 |
| 4,390,130 A | | 6/1983 | Linssen et al. | |
| 4,608,825 A | * | 9/1986 | Fontaine | 60/545 |
| 4,624,443 A | * | 11/1986 | Eidsmore | 251/65 |
| 4,760,865 A | | 8/1988 | Rilett | |
| 4,813,575 A | * | 3/1989 | O'Connor | 251/82 |
| 5,069,239 A | * | 12/1991 | Bunce et al. | 251/65 |
| 5,303,842 A | * | 4/1994 | Harp et al. | 220/562 |
| 5,344,221 A | * | 9/1994 | MacWilliam | 303/89 |
| 5,375,684 A | * | 12/1994 | Asher et al. | 188/353 |
| 5,392,876 A | * | 2/1995 | Linares | 180/287 |
| 5,528,216 A | * | 6/1996 | Main | 340/426 |
| 5,586,589 A | * | 12/1996 | Voelker | 141/349 |
| 5,632,294 A | * | 5/1997 | Benton | 137/1 |
| 5,651,400 A | * | 7/1997 | Corts et al. | 141/198 |
| 5,687,950 A | | 11/1997 | Woodcock | |

FOREIGN PATENT DOCUMENTS

| | | |
|---|---|---|
| EP | A572258 | 12/1993 |
| GB | A2260367 | 4/1993 |
| GB | A2272021 | 5/1994 |

\* cited by examiner

Primary Examiner—John Rivell
(74) Attorney, Agent, or Firm—Birch, Stewart, Kolasch & Birch, LLP

(57) ABSTRACT

A valve which prevents the filling of a fluid container through a port (6) by an unauthorized party, and, at the same time, allows the filling of the container through the same port (6) by an authorized party. The valve is operated by an actuator means (10) which controls the fluid flow through the valve. The valve combines two major features: (1) operation of the actuator means (10) is by an encoded device (32) whose code is known only to the authorized party; (2) the actuator mean is sealed within the valve housing or container so that physical access to the actuator means (10) is restricted. This combination of features makes the valve tamper-proof and actuatable by authorized parties only. Also disclosed is a valve system and a method for preventing unauthorized access to a fluid container.

21 Claims, 5 Drawing Sheets

METHOD AND VALVE FOR PREVENTING UNAUTHORIZED ACCESS

FIELD OF THE INVENTION

This invention relates to a method for preventing unauthorized access to the interior of a fluid container and to a valve which may be used in the method.

BACKGROUND OF THE INVENTION

Valves are mechanical devices used to control the flow of a gas or liquid. Control is exerted by means of a movable element mounted on a valve seat, that opens, shuts or partially obstructs an opening in a passageway. Numerous types of valves exist, including gate, globe, needle, plug and butterfly valves. A check (or non-return) valve is a valve which automatically limits flow to a single direction. Check valves are very useful when flow is desired in one direction, but not in the opposite direction. Generally, the movable element is displaced by the fluid flow so as to allow flow in the desired direction. If, however, the flow direction reverses, the element is compressed by the flow against a valve seat thereby obstructing the fluid flow. Thus, the flow control of the valve is self-acting, being controlled by the fluid flow.

Various types of pressurized fluids, both liquids and gases, are often stored in reusable containers. The containers are generally sold, leased or given by the fluid manufacturer or marketer to retailers or consumers with the understanding that the manufacturer is the sole source of the contents of the container. This understanding may be expressed as a clause in an agreement between the supplier and the customer, or may be as a result of local legal requirements and/or safety regulations. The manufacturer of the fluid therefore has an interest in ensuring that an unauthorized party is unable to tamper with the contents of the container, e.g. to introduce another fluid into the container.

One example of the above relates to LPG (cooking gas) containers or cylinders. A gas supply company which sells or leases a gas container to a consumer will usually also contract to refill the container when it is empty, thus allowing the company to earn a profit. The company is therefore interested in preventing competitors from refilling its gas containers with the competitor's gas. Another example is reusable pressurized soft drink containers, where the consumer wants to be certain that the liquid in the container is the original liquid. A further example relates to reusable beer kegs.

In all of the above examples, the introduction of a check valve into the filling port of the container would allow emptying of the contents of the container during normal use, and prevent refilling by an unauthorized party. However, the use of a check valve would also prevent the legitimate party to refill the container, thus negating the advantage incurred by its use. It would therefore be advantageous if the check valve could be made bidirectional when desired by an authorized party.

In a case where the container has separate inlet and outlet ports, it would be desirable if the inlet port would contain a tamper-proof valve which could only be actuated by an authorized party.

U.S. Pat. No. 4,390,130 to Linssen discloses an electromagnetically actuatable valve which serves to inject fuel into the intake tube of an internal combustion engine having externally supplied ignition. A movable valve member in the form of a ball element dynamically alternates between two positions depending on the state of a magnetic element.

SUMMARY OF THE INVENTION

It is an object of the present invention to provide a valve which is tamper proof and which is externally actuated by an encoded device.

It is a further object of the present invention to provide a check valve which can be made bi-directional.

It is a still further object of the present invention to provide a valve system which is operable only by an authorized party.

It is another object of the present invention to provide a method for preventing the unauthorized filling of a fluid container.

In one aspect of the invention, there is provided a valve for controlling fluid flow therethrough into a container comprising, (1) a valve housing; and (2) a flow control element which, in a first state, prevents fluid flow through the valve housing in a specified direction. The operation of the flow control element is controlled by a dedicated actuator means, wherein the flow control element may be caused to be reversibly altered to a second state by an external control means thereby allowing fluid flow through the valve housing in the specified direction. The external control means operates through the dedicated actuator means, and the dedicated actuator means is sealed within the valve housing or within the container.

In the present specification, the following terms have the indicated meanings:

Fluid includes any flowable material such as e.g. liquids, powders or particles and gases.

Flow control element—a movable valve element that opens, shuts or partially obstructs an opening in a fluid passageway. Non-limiting examples of such elements are the valve elements of check, gate, globe, needle, plug and butterfly valves.

Actuator means—a device which causes the flow control element to pass from one state to another. Non-limiting examples of such means are a solenoid, a magnet, a piston, an electromagnet and a motor.

A "dedicated" object—an object to which operational access is restricted by an encoded device, so that only authorized users who are in possession of the code may access the object. Non-limiting examples of "dedication" devices are a microprocessor, a smart chip, a transponder, infra-red transmission and an encoded magnet.

"sealed" object—an object to which physical access is restricted by the structure of the valve housing or container, so that the object cannot be accessed using conventional opening means (such as screws).

External control means—means outside the valve housing which actuate the actuator means. Non-limiting examples of external control means are a wireless control terminal which activates a magnetic coil by, e.g. radio waves, a wired control terminal, a control terminal which transfers energy to a secondary coil by induction (the primary coil being in the terminal), and an encoded magnet.

The valve of the present invention comes to prevent the filling of a fluid container through a port by an unauthorized party, and, at the same time, comes to allow filling of the container through the same port by an authorized party. The valve of the invention combines two features: (1) the actuator means which controls the operation of the flow control element is dedicated (as defined above); (2) the actuator means is sealed (as defined above) within the valve housing. This combination of features makes the valve tamper-proof and actuatable by authorized parties only.

The valve of the invention differs from conventional valves in that the actuator means is sealed within the valve housing. In most actuated valves having an actuator means, an option exists to manually operate the valve or to service the actuator means by removing or inactivating the actuator means. In the present invention, on the other hand, the actuator means cannot be accessed (other than by physically breaking the valve housing or the container), so that if the actuator means fails, it becomes necessary to replace the entire valve.

The valve of the invention may be mounted within or on the input port of a fluid container, so that only a party possessing the code of the dedicated actuator means may fill the container. Alternatively, the valve may be mounted within the container, proximately to the input port, so that the actuator means is sealed within the container.

Examples of fluid containers which may be used with the valve of the invention include but are not limited to domestic gas cylinders, gas storage tanks, gasoline tanks, tanks or cylinders containing air, oxygen, nitrogen, helium, hydrogen, carbon dioxide, cooling gases such as freon, concentrated soft drinks, beer kegs, etc.

In one embodiment of the first aspect of the invention, there is provided a check valve for controlling fluid flow therethrough, comprising a valve housing and a flow control element. The flow control element in a first state, allows fluid flow through the valve housing in one direction but not in an opposite direction, wherein the flow control element may be caused to be reversibly altered to a second state by a dedicated external control means thereby allowing fluid flow through the valve housing in the opposite direction.

The check valve of the invention in a first state operates as a conventional check valve, but can be reversibly altered to a second state by an external control means, in which it operates as a bidirectional valve. The valve housing may be any conventional housing as is well known to the skilled man of the art. The flow control element may be any standard check valve element such as in a swing, ball or vertical valve.

The flow control element in a first state allows fluid flow in one direction but not in the opposite direction, as in a conventional check valve. The element, however, may be altered to a second state in which the fluid flow is also permitted in the opposite direction, unlike a conventional check valve. The displacement of the control element is effected by a dedicated external control means, so that a functional correlation exists between the control means and the flow control element, as will be described in more detail below. The flow control element may return to the first state either by operation of the control means, or by its removal, depending on its mode of operation.

In a second aspect of the invention, there is provided a valve system for controlling fluid flow comprising:
(a) a valve, comprising a valve housing, and a flow control element which, in a first state, prevents fluid flow through the valve housing in a specified direction, the operation of the flow control element being controlled by a dedicated actuator means; and
(b) an external control means capable of causing the flow control element to be reversibly altered to a second state thereby allowing fluid flow through the valve housing in the specified direction, the external control means operating through the dedicated actuator means, wherein the dedicated actuator means is sealed within the valve housing.

In one embodiment of the second aspect of the invention, there is provided a valve system for controlling fluid flow comprising a check valve according to the invention and an external control means capable of causing the flow control element of the check valve to be reversibly altered from the first state to the second state.

In a third aspect of the invention, there is provided a device for preventing unauthorized access to the interior of a fluid container comprising a port. The device is mounted on the port, and comprises a check valve according to the invention.

By using the check valve of the invention, unauthorized filling of a fluid container can be prevented, while the authorized party is able to fill the container by using the dedicated control means in his possession. The check valve may be placed either in the cock of the container, or in the container itself.

In a fourth aspect of the invention, there is provided a method for preventing unauthorized filling access to the interior of a fluid container, the container comprising a port, the method comprising the step of sealing the port with a device comprising a valve according to the invention.

In one embodiment of this aspect of the invention, there is provided a method for preventing unauthorized access to the interior of a fluid container, the container comprising a port, the method comprising the step of sealing the port with a device comprising a check valve according to the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
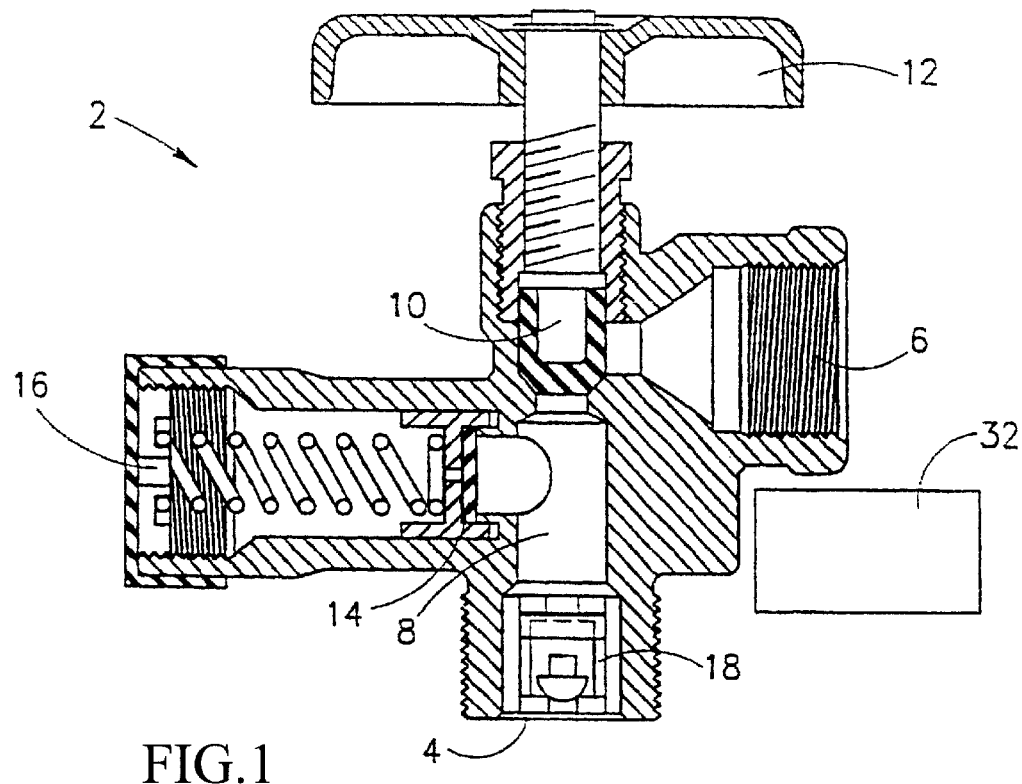
FIG. 1 is a side sectional view of a gas cock incorporating a check valve according to one embodiment of the present invention.

Referring now to FIG. 1, there is illustrated a cock 2 which is adapted to be mounted on a gas container (not shown). In the following description, gas under pressure is often supplied in a liquefied form, i.e. liquefied gas. A gas container is therefore filled with a liquid, which subsequently is dispensed in a gaseous state. For convenience, the invention will be described in the following by referring to the flow of gas into and out of the container.

The cock includes an end port 4 at its bottom side for coupling to the port of the gas container, and a side port 6 for allowing the input and exit of the gas through the cock.

A passageway 8 connects between the end port 4 and side port 6, and a gate valve 10, raised and lowered by a handle 12, opens and closes the flow path between the side port and the passageway. A spring biased sealing valve 14 closes off a release port 16 which acts as a pressure release valve.

Figure 2:
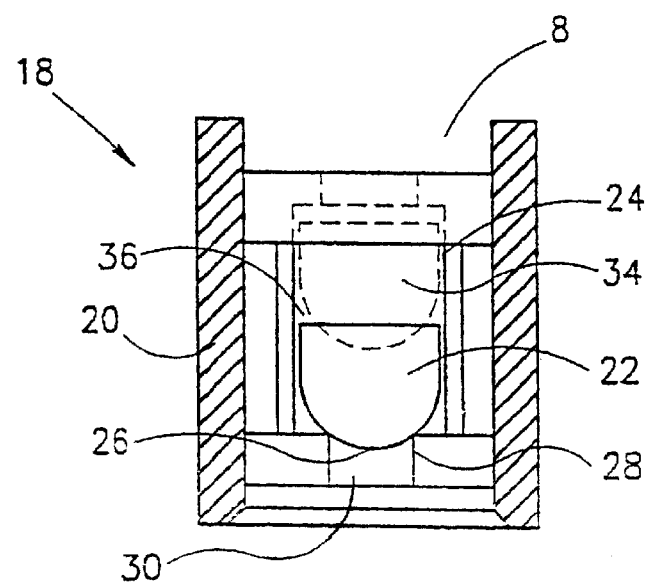
FIG. 2 is an enlarged sectional view of the check valve appearing in FIG. 1.

One embodiment of a check valve 18 according to the invention is illustrated and positioned within the end port 4. Details of the check valve are illustrated in FIG. 2 which shows the valve housing 20, and a flow control element 22 which is vertically displaceable within a bore 24. In a first state, shown in the figure as the position of element 22, a tapered head 26 of the element sits in a valve seat 28 positioned above a valve aperture 30. In this state the gas may flow from the container through the aperture 30 and bore 24 to the passageway 8. The position of the element may alternate between the lower position 36 and the upper position 34 depending on the pressure in the gas container and its slant. If it is attempted to introduce gas into the container through the side port 6, the control element 22 is pressed into flow obturating engagement against the valve seat 28 sealing off the aperture 30 and preventing filling of the container. Thus, the check valve in the first state allows fluid flow in one direction only. It will be understood that the check valve 18 may be positioned at other locations in the cock 2, e.g. in the side port 6.

In this embodiment, the flow control element 22 is made of a material which reacts to a magnetic field, such as iron. When a control means, in the form of a magnet 32, is placed at an appropriate position above the check valve 18, the state of the element 22 is altered by its being displaced upwards to the upper position 34, as shown in FIG. 2, where it persists. In this second state, the fluid may flow in both directions, since the aperture 30 is unblocked. The magnet acts as an external control means to allow bi-directional flow through the check valve. The type, strength and state of the magnet necessary to displace the control element will depend on the weight of the element the displacement resistance, and the distance between the magnet and the element, and may be empirically ascertained by the skilled man of the art. Removal of the magnet allows the element to return to its first state.

In the event that it is desired to restrict access to the interior of the container to authorized personnel only, the element 22 may be "dedicated" by incorporating a plurality of bar magnets having opposite polarities in a specific spatial arrangement. Such a dedicated magnetized element will be attracted only by a magnetic field generated by an identical dedicated control means having a corresponding arrangement of magnets. A similar control element-control means combination may be prepared using electromagnets. In this way, the control means may be "encoded" thus preventing unauthorized opening of the check valve by someone not possessing the dedicated control means.

Figure 3:
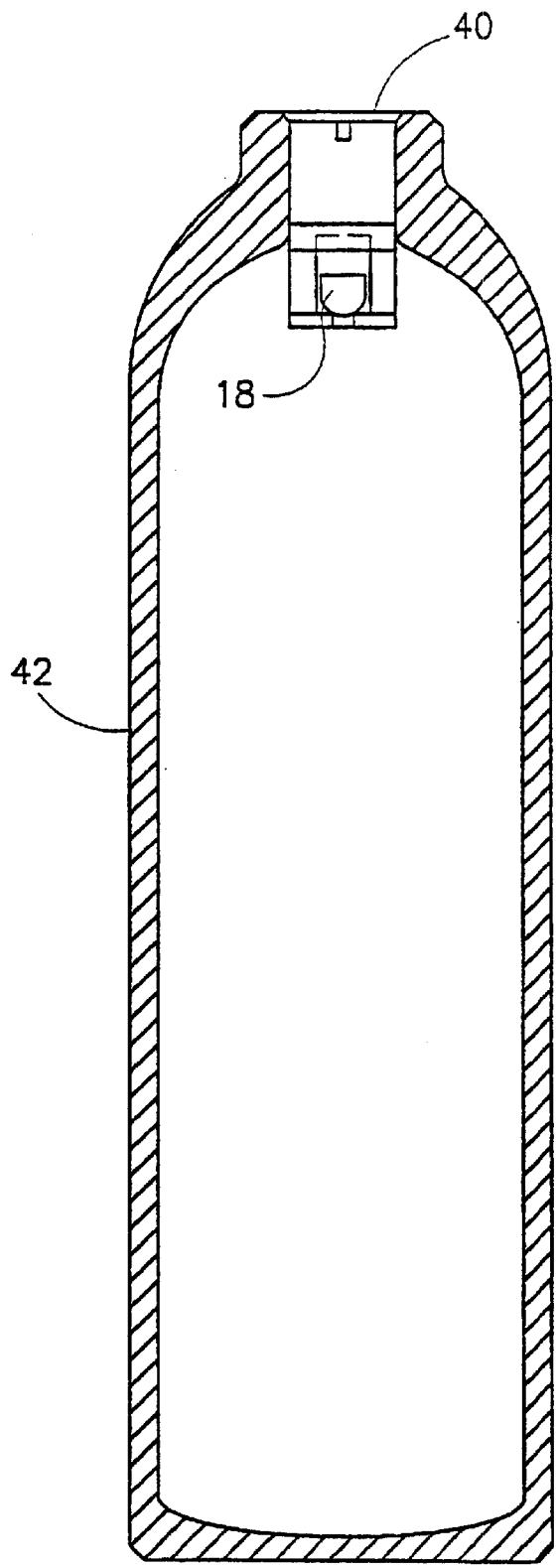
FIG. 3 is a side sectional view of a gas container incorporating a check valve according to one embodiment of the present invention.

FIG. 3 illustrates an alternate embodiment of the invention in which the check valve 18 is positioned within a port 40 of a gas container 42. The operation of the valve is as described above with respect to the embodiment of FIG. 1.

Figure 4:
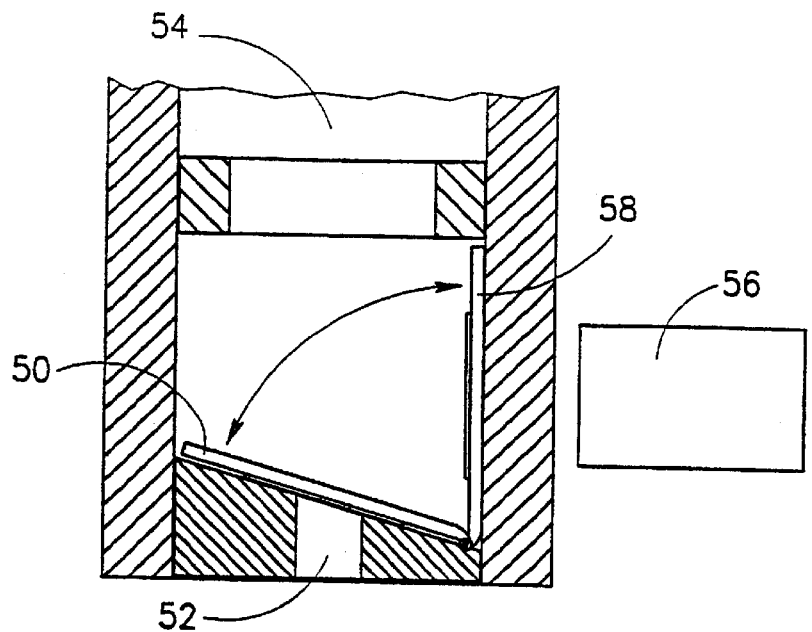
FIG. 4 is a side sectional view of another embodiment of a check valve according to the invention.
Figure 5:
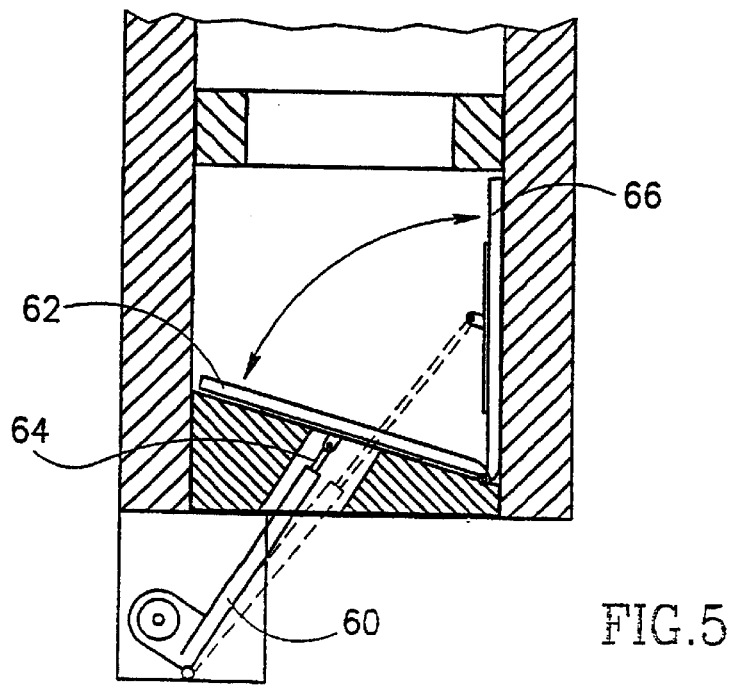
FIG. 5 is a side sectional view of a further embodiment of a check valve according to the invention.

An alternate embodiment of the flow control element is illustrated in FIG. 4 in the form of a magnetized plate 50. The plate 50 in a first state loosely covers the valve aperture 52 so that gas can flow from the container (not shown) into the passageway 54, but not in the opposite direction. Placing a magnet 56 near the valve causes the plate to be reversibly altered to a second state by holding the plate at position 58, thus leaving the aperture 52 unblocked so that flow is bi-directional. As in the embodiment of FIG. 1, the magnet and control element may be dedicated.

The use of a magnetized control means and flow control element is advantageous when combustible gases are involved. If non-combustible gases are involved, a motor 60 may be used to displace the plate 62. A piston 64 driven by the motor and attached to the plate displaces the plate between the first and second states. When the plate is in the lower position 62, he fluid flow is one-way, whereas when the plate is held in the upper position 66 by the piston, the fluid flow is bi-directional. The motor may be actuated by a remote-control device as is well known to the skilled man of the art. Such devices are easily encoded, for example by using predetermined electromagnetic, sonic or voice-activation frequencies, or infrared or electronic coding.

Figure 6:
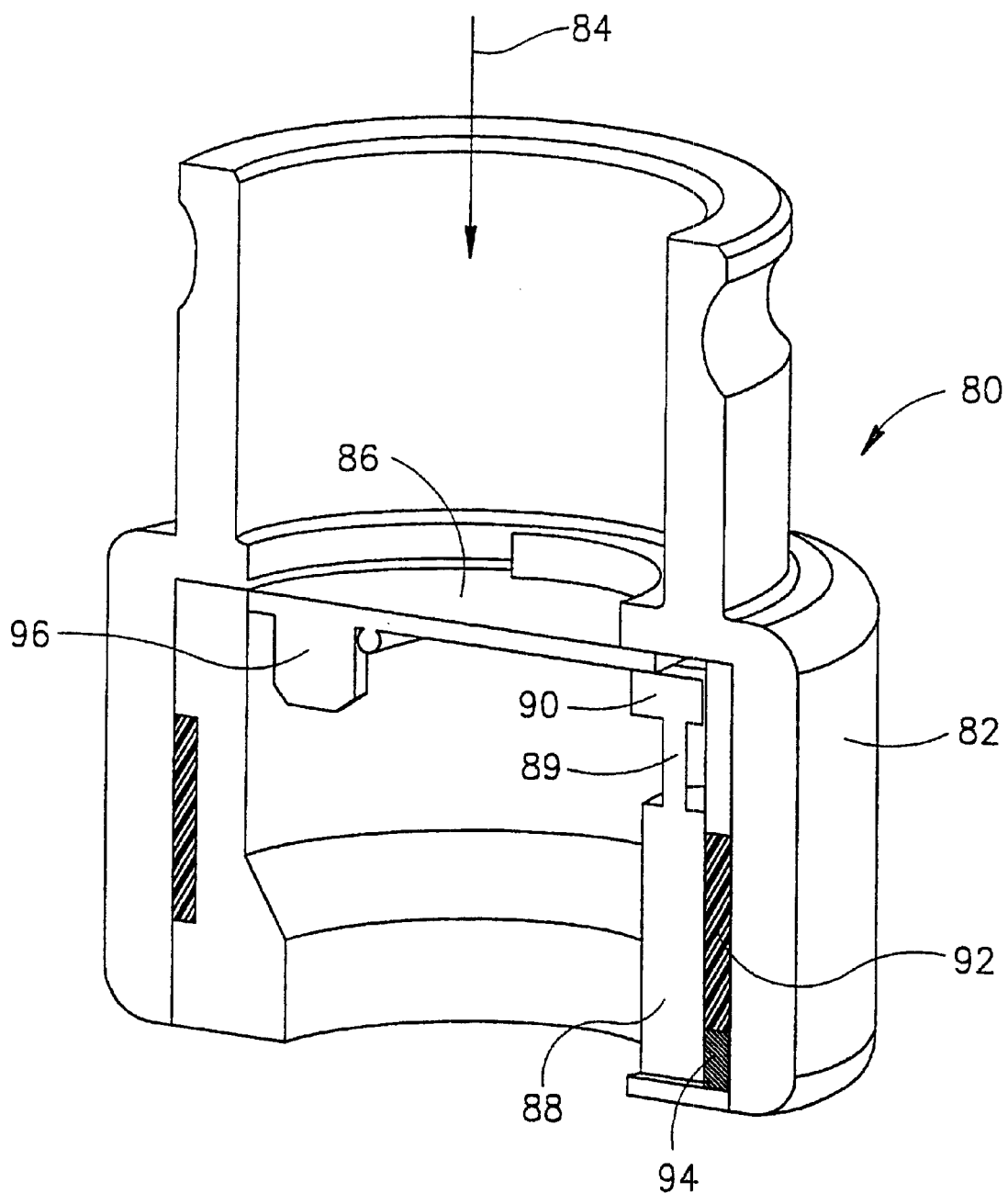
FIGS. 6 and 7 are perspective views of a valve according to another embodiment of the invention, in a closed (FIG. 6) and open (FIG. 7) configuration.
Figure 7:
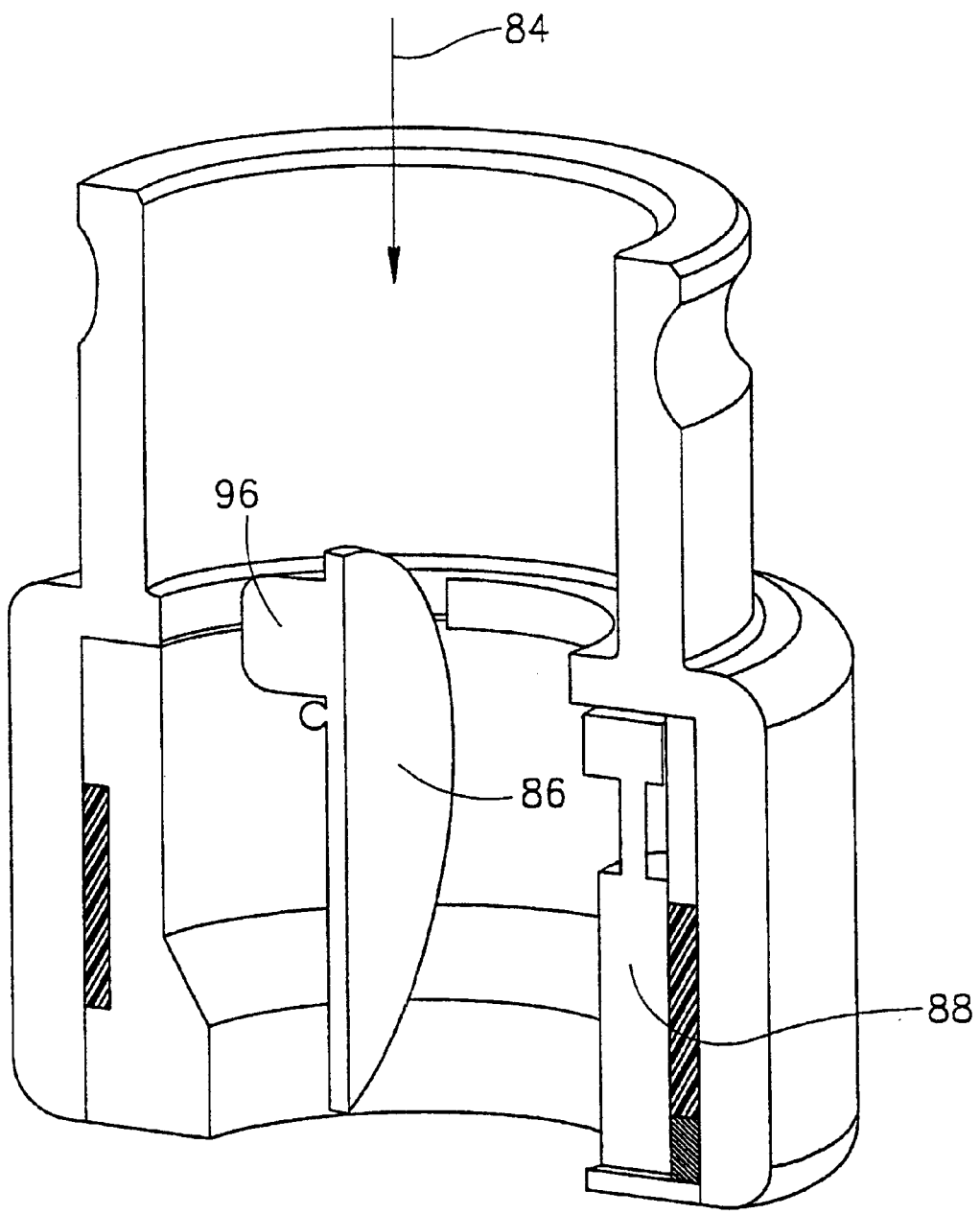

Referring now to FIGS. 6 and 7, there is illustrated another embodiment of a valve according to the invention, for use in a vertical position.

In FIG. 6, a flap valve, generally indicated by 80, is in a closed configuration, and comprises a valve housing 82 with the fluid flow direction along the valve axis as indicated by the arrow 84. A flow control element in the form of a pivoting flap 86 is in a first position which prevents flow through the valve, thus preventing unauthorized filling of a container through the valve. The flap is held in a position perpendicular to the valve axis by means of a dedicated actuator means in the form of a shoulder 90 which rotates on an axis 89 extending from a motor 88. The motor is sealed within the valve housing and is not physically accessible from outside the valve.

An annular secondary coil 92, such as a magnetic coil, is positioned within the wall of the valve housing and is in contact with the motor 88 through an electric circuit 94 which comprises an encoded microprocessor and a power switch. The electric circuit is also sealed within the valve housing. A remote control terminal (not shown) provides both energy to the coil through induction and information in the form of a code or I.D. number to the microprocessor, so that the microprocessor, on receiving the authorized code, allows energy transfer from the coil to the motor. Activation of the motor results in a 90° rotational movement of the shoulder 90, thus freeing the flap 86 which is pushed by the fluid flow to a second position which allows fluid flow through the valve (FIG. 7). The shoulder then returns to its original position. On cessation of the fluid flow, the flap 86 returns to its original horizontal position due to the presence of a weight 96 on the bottom surface of one end of the flap. In this way, an authorized party in possession of the correct code may fill the container.

The motor may be controlled by alternate control means, as is well known to the skilled man of the art. For example, the coil may be replaced by wires to an external energy source and control means. The transfer of energy from the energy source to the motor would be dependent on the activation of the microprocessor by the correct code.

Various modifications and further embodiments of the invention will become apparent to the skilled artisan on the basis of this disclosure. The scope of the invention, however, is determined by the following claims.

What is claimed is:

1. A valve for controlling fluid flow therethrough into a container, comprising,
   a valve housing;
   a flow control element which, in a first state, prevents fluid flow through said valve housing in a specified direction, and which, in a second state, allows fluid flow through said valve housing in said specified direction;

dedicated actuator means sealed within one of the valve housing and the container to which said valve housing is attached, the dedicated actuator means selectively moves said flow control element from the first state to the second state only in response to a signal peculiarly dedicated to said dedicated actuator means; and external control means that provides said signal from an outside of the one of the valve housing and the container to operate said dedicated actuator means.

2. A valve according to claim 1 wherein said flow control element is a valve member of a valve selected from the group consisting of a gate valve, globe valve, check valve, needle valve, flap valve, butterfly valve, and plug valve.

3. A valve according to claim 1 wherein said dedicated actuator means is selected from the group consisting of a solenoid, a magnet, an electromagnet, and a motor.

4. A valve according to claim 3 wherein said dedicated actuator means is dedicated by means of polarized magnets, a smart chip, a transponder, infrared transmission, or a microprocessor chip.

5. A valve according to claim 1 wherein said external control means is a magnet, an external energy source, or a remote control terminal.

6. A valve according to claim 1, wherein said dedicated actuator means is sealed within one of the valve housing and the container such that said one of the valve housing and the container must be physically broken to access said dedicated actuator means.

7. A valve system for controlling fluid flow, comprising:
a valve having a valve housing and a flow control element which, in a first state, prevents fluid flow through said valve housing in a specified direction, and which, in a second state allows fluid flow through said valve housing in the specified direction;
a dedicated actuator means sealed within said valve housing and adapted to control operation of said flow control element only in response to a signal peculiarly dedicated to said dedicated actuator means; and
an external control means that provides said signal from an outside of the valve housing to operate said flow control element to be reversibly switched to the second state.

8. A method for preventing unauthorized filling access to the interior of a fluid container having an inlet port, while allowing authorized filling access thereto, the method comprising:
sealing said port with a device provided by,
providing a valve housing;
providing a flow control element which, in a first state, prevents fluid flow through said valve housing in a specified direction, and which, in a second state, allows fluid flow through said valve housing in said specified direction; and
sealing dedicated actuator means within one of the valve housing and the container to which said valve housing is attached, the dedicated actuator means selectively moves said flow control element from the first state to the second state only in response to a signal peculiarly dedicated to said dedicated actuator means,
wherein said dedicated actuator means is operated by,
providing said signal from an outside of the one of the valve housing and the container.

9. A check valve for controlling fluid flow therethrough, comprising:
a valve housing;
a flow control element which, in a first state, allows flow through said valve housing in one direction but not in an opposite direction;
a dedicated actuator means sealed within the valve housing and adapted to cause the flow control element to be reversibly switched to a second state thereby allowing fluid flow through said valve housing in said opposite direction only in response to a signal peculiarly dedicated to said dedicated actuator means; and
a dedicated external control device that provides said signal to control said dedicated actuator device from an outside of said valve housing to switch said flow control element to the second state by operating said dedicated actuator device.

10. A check valve according to claim 9, wherein said flow control element is adapted to react with a magnet, and whose state is adapted to be altered by a correspondingly magnetized control means.

11. A check valve according to claim 9, wherein said flow control element is switched to the second state by a motor driven piston actuated by said external control means.

12. A check valve according to claim 9, wherein said flow control element is adapted to react with a magnet, and said dedicated actuator means reversibly switches said flow control element by a magnetic force.

13. A check valve according to claim 9, wherein said flow control element is displaceable by a motor driven piston, and said dedicated actuator means is adapted to actuate said motor.

14. A method for preventing unauthorized access to the interior of a fluid container having a port, comprising the step of:
sealing said port with a device having a check valve according to claim 9.

15. A device for preventing unauthorized access to the interior of a fluid container having a port, comprising:
a check valve according to claim 9 mounted on said port.

16. A device according to claim 15 wherein said fluid is a liquefied gas.

17. A device according to claim 15 wherein said fluid is a gas selected from the group consisting of air, oxygen, hydrogen, nitrogen, helium, carbon dioxide, and cooling gases.

18. A device according to claim 15, wherein said fluid is a liquid.

19. A fluid container, comprising:
a port; and
a check valve according to claim 9 mounted within said port thereby controlling flow of a fluid through said port.

20. A valve for controlling fluid flow therethrough into a container, comprising,
a valve housing;
a flow control element which, in a first state, prevents fluid flow through said valve housing in a specified direction, and which, in a second state, allows fluid flow through said valve housing in said specified direction; and
dedicated actuator means sealed within one of the valve housing and the container to which said valve housing is attached, the dedicated actuator means selectively moves said flow control element from the first state to the second state only in response to a signal peculiarly dedicated to said dedicated actuator means.

21. A valve for controlling fluid flow therethrough into a container, comprising, a valve housing;

a flow control element which, in a first state, prevents fluid flow through said valve housing in a specified direction, and which, in a second state, allows fluid flow through said valve housing in said specified direction;

dedicated actuator means sealed within one of the valve housing and the container to which said valve housing is attached, the dedicated actuator means having a motor that selectively moves said flow control element from the first state to the second state only in response to a signal peculiarly dedicated to said dedicated actuator means; and external control means that provides said signal to operate said motor from an outside of the one of the valve housing and the container.

* * * * *

UNITED STATES PATENT AND TRADEMARK OFFICE
CERTIFICATE OF CORRECTION

PATENT NO. : 6,568,424 B1  
DATED : May 27, 2003  
INVENTOR(S) : Gilad et al.

Page 1 of 1

It is certified that error appears in the above-identified patent and that said Letters Patent is hereby corrected as shown below:

<u>Title page,</u>
Please change "[12] United States Patent
Galad et al." to
-- [12] United States Patent
Gilad et al. --

Please change "[76] Shimon Galad, Bereshit Street 1, 47201 Ramat Hasharon (IL); Oded Arbel, Neurim Street 54, 37000 Karkur (IL)" to
-- [76] Shimon Gilad, Bereshit Street 1, 47201 Ramat Hasharon (IL); Oded Arbel, Neurim Street 54, 37000 Karkur (IL) --

Signed and Sealed this

Twenty-eighth Day of October, 2003

JAMES E. ROGAN
*Director of the United States Patent and Trademark Office*